United States Patent [19]

Shiozaki et al.

[11] Patent Number: 5,193,020
[45] Date of Patent: Mar. 9, 1993

[54] METHOD FOR PRODUCING COMPENSATOR FOR LIQUID CRYSTAL DISPLAY

[75] Inventors: Iwane Shiozaki; Takehiro Toyooka, both of Yokohama; Shigeki Iida, Kawasaki, all of Japan

[73] Assignee: Nippon Oil Company, Limited, Tokyo, Japan

[21] Appl. No.: 721,174

[22] Filed: Jun. 26, 1991

[30] Foreign Application Priority Data

Jun. 27, 1990 [JP] Japan .................. 2-166833

[51] Int. Cl.$^5$ .................. G02F 1/1335; G02F 1/13; C09K 19/52
[52] U.S. Cl. .................. 359/73; 359/103; 359/106; 252/299.01
[58] Field of Search .................. 252/299.01; 359/73, 359/103, 106; 428/1

[56] References Cited

U.S. PATENT DOCUMENTS

| | | | |
|---|---|---|---|
| 5,054,888 | 10/1991 | Jacobs et al. | 252/299.01 |
| 5,067,797 | 11/1991 | Yokokura et al. | 359/75 |
| 5,073,294 | 12/1991 | Shannon et al. | 252/299.01 |

*Primary Examiner*—William L. Sikes
*Assistant Examiner*—Anita Pellman Gross
*Attorney, Agent, or Firm*—Scully, Scott, Murphy & Presser

[57] ABSTRACT

A compensator for liquid crystal display is produced by transferring a compensating layer formed by a liquid crystalline polymer on an orientating base onto a light transmitting base.

5 Claims, 2 Drawing Sheets

METHOD FOR PRODUCING COMPENSATOR FOR LIQUID CRYSTAL DISPLAY

BACKGROUND OF THE INVENTION

The present invention relates to a method for producing a compensator for liquid crystal display useful in cancelling the coloration of a liquid crystal display and obtaining a black-and-white display.

Liquid crystal display occupies an important position in the display field because of such characteristic features as being driven at a low voltage, light weight and low cost. For example, a super-twisted nematic (hereinafter referred to simply as "STN") liquid crystal display of a simple matrix driven type permits a large screen display in a multiplex driven dot-matrix system, and as compared with the conventional twisted nematic (TN) type liquid crystal display, the STN liquid crystal display is characteristic in that the contrast is high and the viewing angle is wide. Therefore, the STN liquid crystal display is widely used in the field of liquid crystal display which requires a large-screen display such as, for example, personal computers, word processors and various data terminals. However, since the STN type makes display on the basis of a birefringence effect, coloration such as yellow or blue has been unavoidable. Such a colored mode display is not only undesirable to the users but also involves a serious drawback of being unable to cope with coloring of a display unit.

Also in a liquid crystal display using a thin film transistor (hereinafter referred to simply as "TFT") which is a typical example of the active matrix driven type, there arises, in addition to the difficulty of manufacture, a serious drawback of coloration when the cell gap is thinned for the purpose of improving the response speed or improving the viewing angle characteristic.

For changing the colored mode into the black-and-white mode there has been practically adopted a so-called double-cell method wherein compensation is made by disposing on an STN liquid crystal cell for display another liquid crystal cell for compensation having the same cell gap and a reversed twist angle. For a simpler method, compensating films (phase films) such as stretched polycarbonate films adjusted only in birefringence characteristic in conformity with a display cell have been developed and some of them have been put to practical use.

Although the double-cell method can realize a black-and-white display of a fairly high grade, it involves serious drawbacks such as high cost, heavy weight and large thickness. On the other hand, the phase film compensation method has merits such as being inexpensive, light weight and thin, but the film used therein is a uniaxially stretched film not having a twist structure, so the compensation capable of being made by this method is only of phase difference and not of optical rotatory dispersion. Thus, the compensating performance, which is important, is unsatisfactory and there merely is obtained a pseudo-black-and-white display. Also as to contrast, it is fairly lower than that obtained in the double-cell method.

To compensate for such drawbacks of both methods, the present inventors have previously proposed a compensator for liquid crystal display constituted by a liquid crystalline polymer film with a twisted nematic structure solidified (Japanese Patent Laid Open No.150559/1989). This proposed compensator was an epoch-making compensator wherein an equal compensating performance to that attained by the double-cell method was imparted to a single film formed on a light transmitting base with alignment film. However, this light transmitting base with alignment film is required to have heat resistance and solvent resistance because at the time of production it also plays the role of orientating the liquid crystalline polymer. The said light transmitting base is further required to be transparent and optically isotropic because it is also used as a constituent of the compensator. Thus, in the conventional methods, requirements for the light transmitting base are strict and so the range of selection of such light transmitting base is narrowed. Consequently, the compensator performance and the product form have been limited.

SUMMARY OF THE INVENTION

It is the object of the present invention to solve the above-mentioned problems.

Having made extensive studies about means for solving the forementioned problems involved in the foregoing compensators for liquid crystal display using a liquid crystalline polymer, the present inventors found that such problems were caused by orientating a liquid crystalline polymer on a single light transmitting base with alignment film to form a compensating layer and using this orientating base as it is as a constituent of a compensator for liquid crystal display. In other words, according to our finding, if the orientating base for the liquid crystalline polymer and the support base as a constituent of the compensator for liquid crystal display are separated from each other, even a base having neither transparency nor optical isotropy can be used as the former, while even a base not having resistance to heat and to solvent can be used as the latter. In this way we accomplished the present invention.

More specifically, the present invention resides in a method for producing a compensator for liquid crystal display characterized in that a compensating layer formed by a liquid crystalline polymer on an orientating base is transferred onto a light transmitting base.

As preferred modes of embodiment of the present invention there are mentioned the above method wherein the liquid crystalline polymer exhibits a twisted nematic orientation in a liquid crystal state and assumes a glassy state at temperatures below a liquid crystal transition point thereof; the above method wherein the light transmitting base is a plastic film; the above method wherein the light transmitting base is a polarizing film; and the above method wherein the light transmitting base is a glass base constituting an upper surface and/or a lower surface of a liquid crystal display cell.

Figure 1:
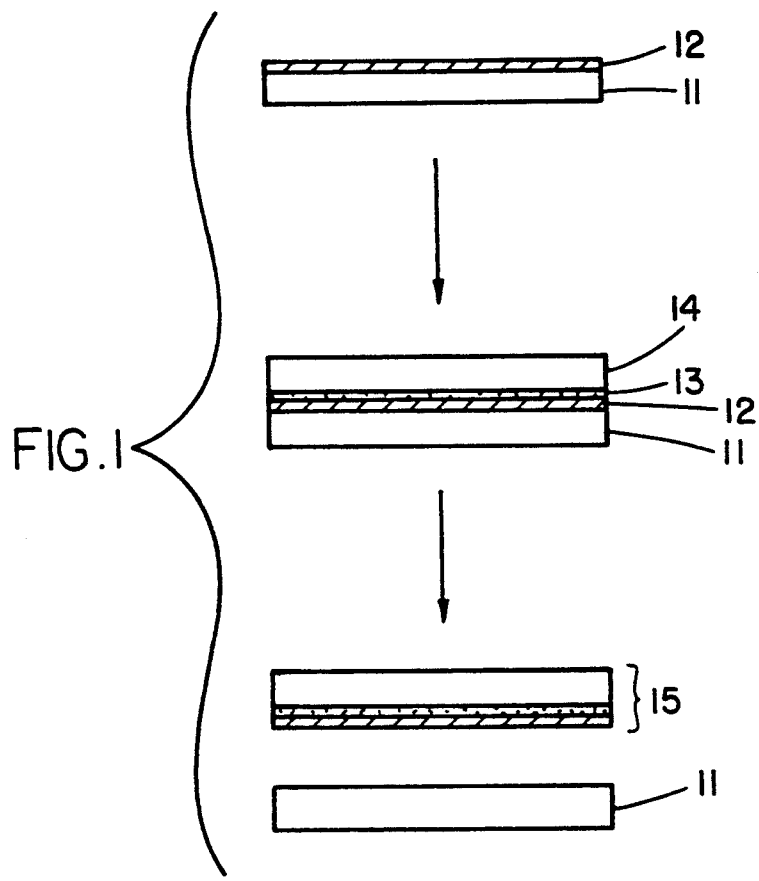
FIG. 1 is an explanatory view of the liquid crystal display compensator producing method of the present invention.

11: orientating base
12: compensating layer (liquid crystalline polymer layer)
13: adhesive layer
14: light transmitting base 15: compensator of the present invention
21: upper polarizing plate
22: compensator of the present invention
23: STN liquid crystal cell
24: lower polarizing plate
31: transmission axis of the lower polarizing plate
32: transmission axis of the upper polarizing plate
33: rubbing direction of a lower electrode base
34: rubbing direction of an upper electrode base
35: molecular orientation direction of the compensating layer in contact with the upper electrode base
36: molecular orientation direction of the compensating layer surface in contact with the upper polarizing plate
- 3a: twist angle of liquid crystal cell molecule
- 3b: twist angle of compensating layer molecule
- 3c: angle between 31 and 33
- 3d: angle between 34 and 35
- 3e: angle between 31 and 32
- 3f: angle between 32 and 36

DETAILED DESCRIPTION OF THE INVENTION

The present invention will be described in detail hereinunder.

First, the method of the present invention will be outlined with reference to FIG. 1. According to the method of the invention, first a liquid crystalline polymer is applied onto an orientating base 11, then heat-treated at a predetermined temperature to orientate the liquid crystalline polymer, followed by cooling to solidify the orientated structure, thereby forming a compensating layer 12. Next, a light transmitting base 14 is stuck onto the compensating layer through an adhesive 13. Then, the compensating layer is peeled off at the interface between the orientating base and the compensating layer and is then transferred to the light transmitting base side, whereby there can be obtained a compensator 15 for liquid crystal display according to the present invention.

The orientating base used in the present invention indicates a base capable of orientating a liquid crystalline polymer. Any base is employable as such orientating base in the invention if only it has the ability of orientating a liquid crystalline polymer, a predetermined resistance to heat and to solvents, and further has releasability permitting the separation of the compensating layer therefrom. Such required orientatability, resistance to heat and to solvents, and releasability, differ depending on the kind and properties of the liquid crystalline polymer used. Typical examples of such orientating base are those comprising sheet- or plate-like bases such as metallic plates, e.g. aluminum, iron and copper plates, ceramic plate, enameled plate and glass plate, and alignment films such as known rubbing-treated polyimide films, rubbing-treated polyvinyl alcohol films, or obliquely vapor-deposited film of silicon oxide. Other examples include those obtained by directly rubbing the surfaces of plastic films or sheets such as films or sheets of polyimides, polyamideimide, polyether imides, polyamides, polyether ether ketones, polyether ketones, polyketone sulfides, polyether sulfones, polysulfones, polyphenylene sulfides, polyphenylene oxides, polyetbylene terephthalates, polybutylene terephthalates, polyacetals, polycarbonates, acrylic resins, polyvinyl alcohols, cellulosic plastics, epoxy resins, and phenolic resins, as well as bases comprising these films or sheets and alignment films formed thereon such as rubbing-treated polyimide films or rubbing-treated polyvinyl alcohol films. Among these plastic films and sheets, some of those having high crystallinity can orientate liquid crystalline polymers merely by being stretched uniaxially. They can be used as orientating bases as they are without being subjected to a rubbing treatment or without attaching a rubbing-treated polyimide alignment film thereto. Examples are polyimides, polyether imides, polyether ether ketones, polyether ketones, polyphenylene sulfides, and polyethylene terephthalates.

Particularly preferred are orientating bases each having a rubbing-treated polyimide layer or polyvinyl alcohol layer on a glass or metallic plate, as well as those obtained by directly rubbing films or sheets of polyimides, polyethylene terephthalates, polyphenylene sulfides, polyether ether ketones, or polyvinyl alcohols.

A liquid crystalline polymer is applied onto the orientating base exemplified above, then dried, heat-treated, to form a uniform twisted nematic structure of monodomain, and thereafter cooled to solidify the orientation without impairing the orientation in the state of liquid crystal, thereby forming a compensating layer on the base. As the liquid crystalline polymer there is used a composition comprising a liquid crystalline polymer which exhibits a uniform nematic orientation of monodomain and which permits the orientated state to be solidified easily, and a predetermined amount of an optically active compound incorporated therein, or liquid crystalline polymer alone which exhibits a uniform twisted nematic orientation of monodomain and which permits the orientated state to be solidified easily.

First, an explanation will be made about the former, i.e., a composition comprising a nematic liquid crystalline polymer and an optically active compound. The liquid crystalline polymer as a base material which exhibits a uniform nematic orientation of monodomain and which permits its orientated state to be solidified easily is required to have the following property as an essential condition. For stable solidification of the nematic orientation, when viewed in terms of a phase series of liquid crystal, it is important that no crystal phase be present in a lower temperature region than nematic phase. If such crystal phase is present, an inevitable passage through it at the time of cooling for solidification results in destruction of the nematic orientation once obtained, thus leading to unsatisfactory transparency and compensating effect. In preparing the compensator of the present invention, therefore, it is absolutely necessary to use a liquid crystalline polymer having glass phase in a lower temperature region than nematic phase. This polymer, when an optically active compound is incorporated therein, exhibits a twisted nematic orientation in the state of liquid crystal and assumes a glass phase at temperatures below a liquid crystal transition point thereof, so that the twisted nematic structure can be solidified easily. There may be used any such polymer which exhibits a nematic orientation in the state of liquid crystal and assumes the state of glass at temperatures below the liquid crystal transition point thereof. Examples are main chain type liquid crystalline polymers such as polyesters, polyamides, polycarbonates, and polyester imides, as well as side chain type liquid crystalline polymers such as polyacrylates, polymethacrylates, polymalonates, and polysiloxanes. Particularly, polyesters are preferred in point of easy preparation, good orientation and high glass transition point. Polyesters containing an ortho-substituted aromatic unit as are most preferred. Polymers containing as a repeating unit an aromatic unit having a bulky substituent group in place of an ortho-substituted aromatic unit or an aromatic unit having fluorine or a fluorine-containing substituent group, are also employable, The "ortho-substituted aromatic unit" as referred to herein means a structural unit with main chain-constituting bonds ortho to each other. Examples are the following catechol, salicylic acid and phthalic acid units as well as substituted derivatives thereof:

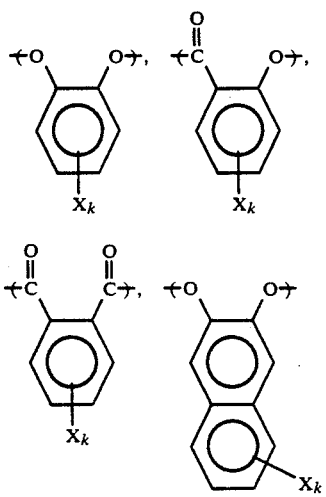

wherein X represents hydrogen, halogen, e.g. Cl or Br, an alkyl or alkoxy group having 1 to 4 carbon atoms, or phenyl, and k is 0 to 2.

The following are particularly preferred:

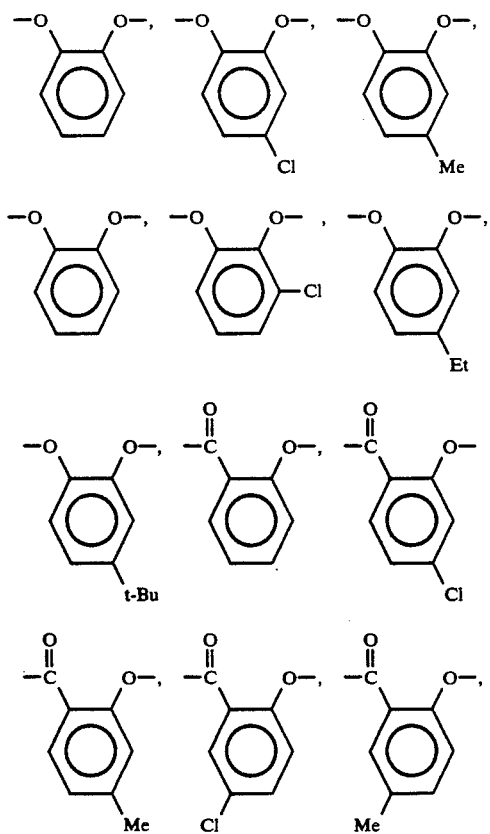

-continued

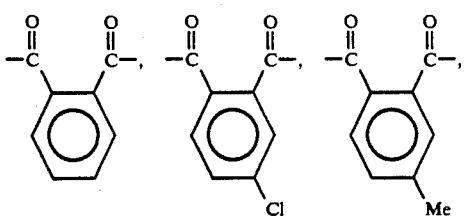

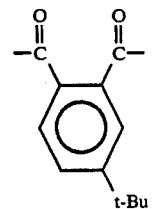

Me: methyl
Et: ethyl
Bu: butyl

Also, as examples of the polyester used preferably in the present invention there are mentioned those containing as repeating units (a) a structural unit (hereinafter referred to as "diol component") derived from a diol and a structural unit ("dicarboxylic acid component" hereinafter) derived from a dicarboxylic acid and/or (b) a structural unit ("hydroxycarboxylic acid component" hereinafter) derived from a hydroxycarboxylic acid containing both carboxyl and hydroxyl groups in one unit. Preferably, these polyesters further contain the foregoing ortho-substituted aromatic unit.

As examples of the diol component there are mentioned the following aromatic and aliphatic diols:

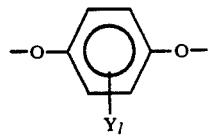

wherein Y represents hydrogen, halogen, e.g. Cl or Br, an alkyl or alkoxy group having 1 to 4 carbon atoms, or phenyl, and l is 0 to 2,

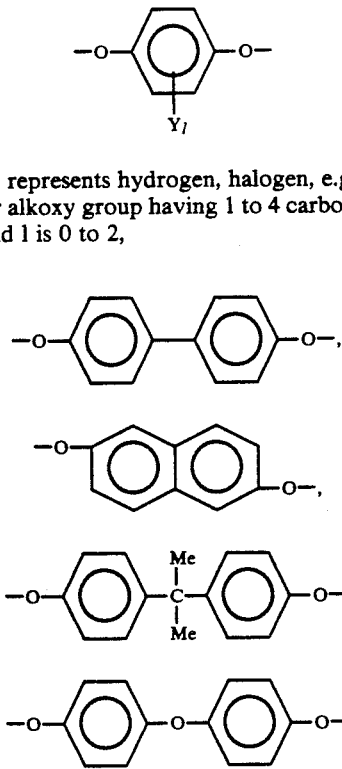

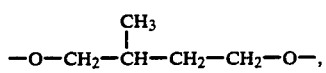 (n is an integer of 2 to 12),

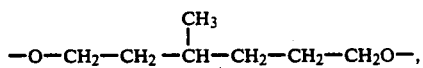

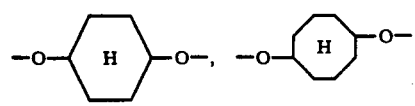

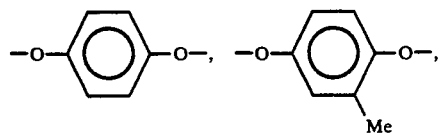

Particularly, the following are preferred:

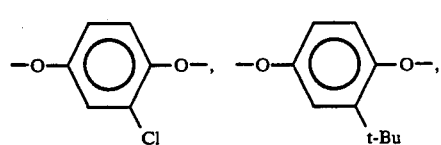

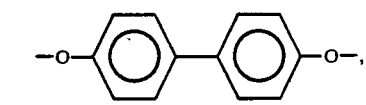

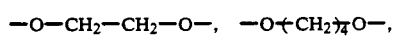

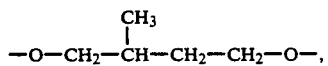

—O(CH₂)₆O—.

As examples of the dicarboxylic acid component, the following may be mentioned:

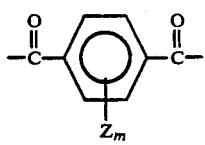

wherein Z represent hydrogen, halogen, e.g. Cl or Br, an alkyl or alkoxy group having 1 to 4 carbon atoms, or phenyl, and m is 0 to 2,

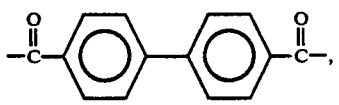

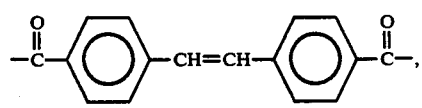

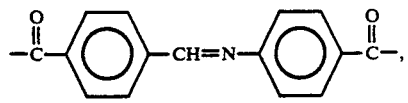

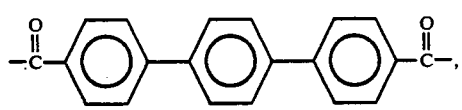

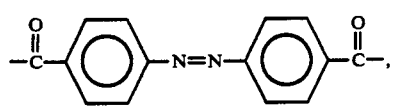

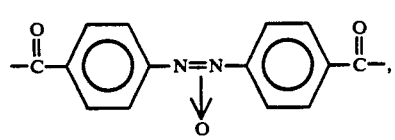

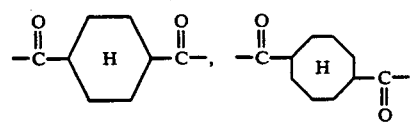

Particularly, the following are preferred:

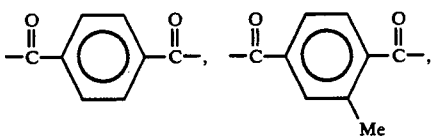

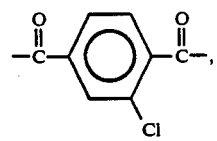

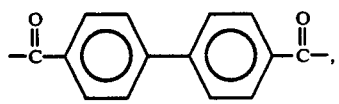

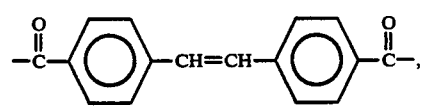

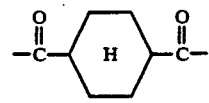

As examples of the hydroxycarboxylic acid component, the following units may be mentioned:

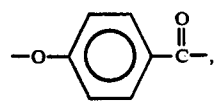

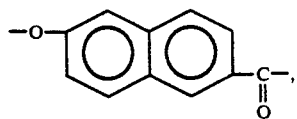

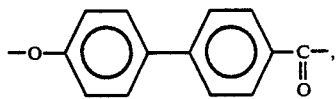

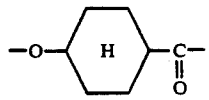

The dicarboxylic acid to diol mole ratio is approximately 1:1 like that of polyesters commonly used (carboxyl to hydroxyl ratio in the case of using a hydroxycarboxylic acid). The proportion of ortho-substituted aromatic units in the polyester is preferably in the range of 5 to 40 mole%, more preferably 10 to 30 mole%.

In the case where the said proportion is smaller than 5 mole%, a crystal phase tends to appear under the nematic phase, so such proportion is not desirable. A proportion larger than 40 mole% is not desirable, either, because the polymer will no longer exhibit liquid crystallinity. The following are typical examples of polyesters which may be used in the present invention:

Polymer consisting essentially of the following structural units:

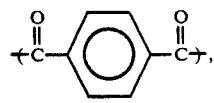

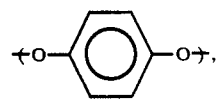

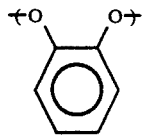

Polymer consisting essentially of the following structural units:

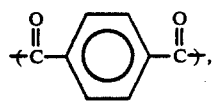

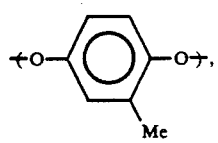

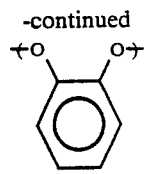

Polymer consisting essentially of the following structural units:

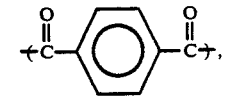

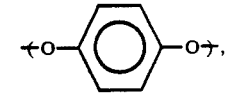

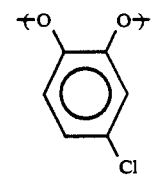

Polymer consisting essentially of the following structural units:

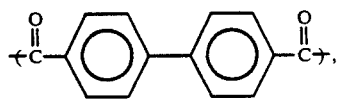

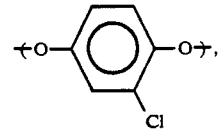

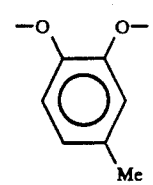

Polymer consisting essentially of the following structural units:

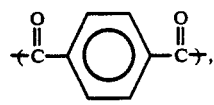

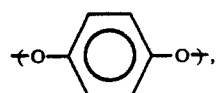

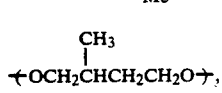

-continued

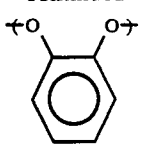

Polymer consisting essentially of the following structural units:

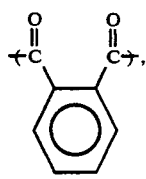

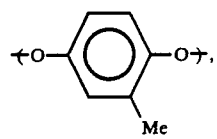

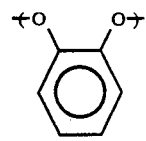

Polymer consisting essentially of the following structural units:

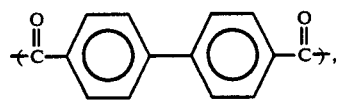

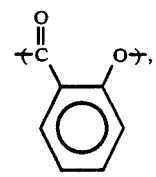

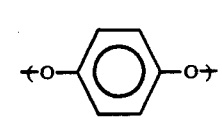

Polymer consisting essentially of the following structural units:

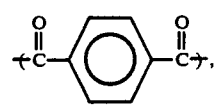

-continued

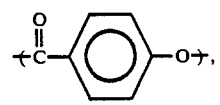

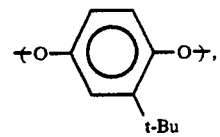

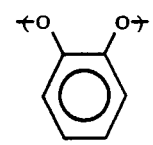

Also preferred are polymers which, in place of ortho-substituted aromatic units, contain as repeating units such bulky substituent-containing aromatic units or aromatic units containing fluorine or fluorine-containing substituents as shown below:

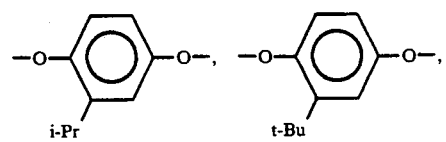

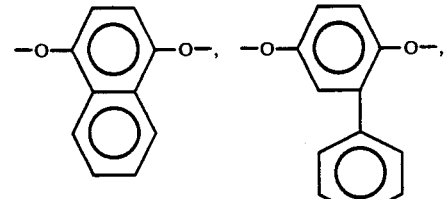

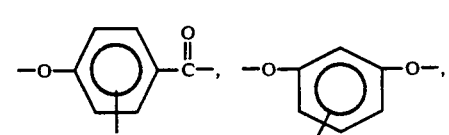

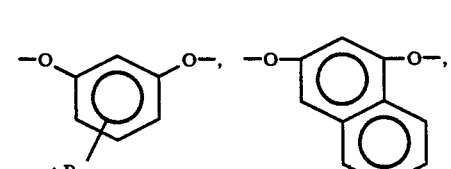

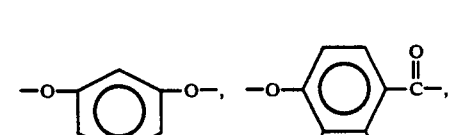

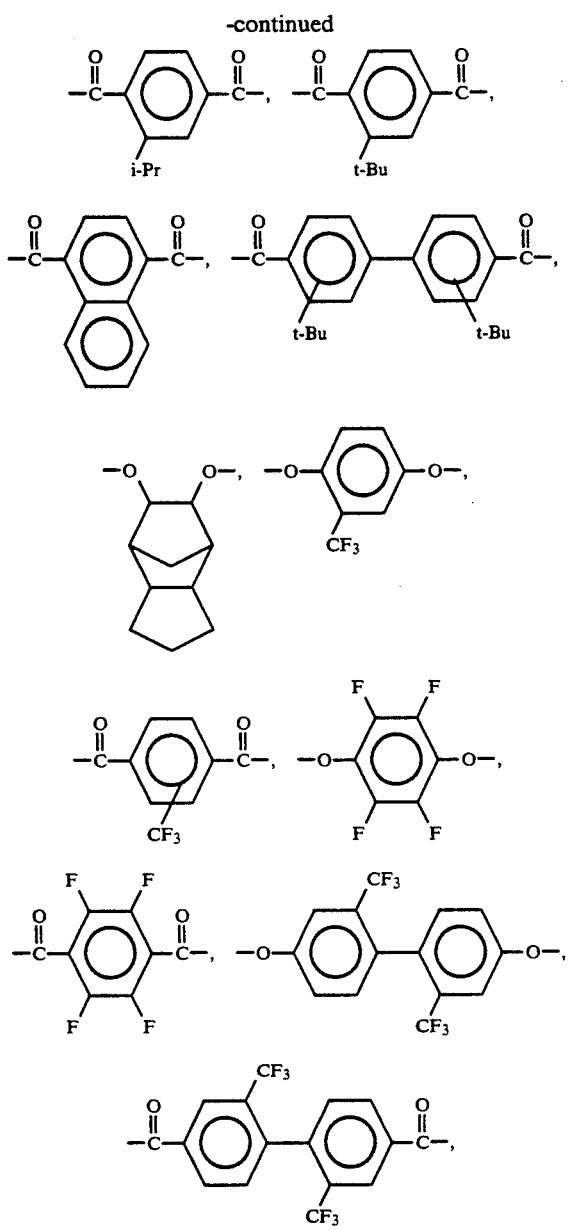

The polymers exemplified above range in molecular weight preferably from 0.05 to 3.0, more preferably 0.07 to 2.0, in terms of inherent viscosity as determined at 30° in a solvent, e.g. a mixed phenol/tetrachloroethane [60/40 (weight ratio)] solvent. An inherent viscosity lower than 0.05 is not desirable because the strength of the resulting film of high molecular liquid crystal will be low, while if the inherent viscosity is higher than 3.0, there will arise such problems as the deterioration of orientatability and an increase of the time required for orientation because of too high viscosity during the formation of liquid crystal. The glass transition points of these polyesters are also important, exerting influence on the stability of orientation after the immobilization thereof. The glass transition temperature is usually not lower than 0° C., preferably not lower than 10° C. Assuming that the working temperature is room temperature or thereabouts, though it also depends on the use, it is desirable that the glass transition points of the polyesters be not lower than 30° C., more preferably not lower than 50° C. In the case of a glass transition point lower than 30° C., the use of the compensator at room temperature or thereabouts may cause a change of the liquid crystal structure once immobilized, thus resulting in the deterioration of a function based on the liquid crystal structure. Therefore, such low glass transition point is not desirable.

How to prepare the polymer used in the present invention is not specially limited. There may be adopted any of the polymerization processes known in this field, e.g. a melt polymerization process or an acid chloride process using an acid chloride of a corresponding dicarboxylic acid.

According to a melt polycondensation process, the polyester can be prepared by polymerizing a corresponding dicarboxylic acid and an acetylated compound of a corresponding diol at a high temperature and in a high vacuum. The molecular weight thereof can be adjusted easily by controlling the polymerization time or the feed composition. For accelerating the polymerization reaction there may be used a known metal salt such as sodium acetate. In the case of using a solution polymerization process, the polyester can be prepared easily by dissolving predetermined amounts of a dicarboxylic acid dichloride and a diol in a solvent and heating the resulting solution in the presence of an acid acceptor such as pyridine.

An explanation will now be made about an optically active compound which is incorporated in the nematic liquid crystalline polymers exemplified above for imparting twist thereto. Typical examples are optically active low-molecular compounds. Any compound having optical activity can be used in the present invention, but from the standpoint of compatibility with the base polymer it is desirable to use optically active, liquid crystalline compounds. The following are concrete examples:

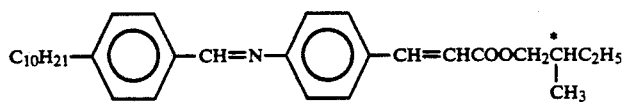

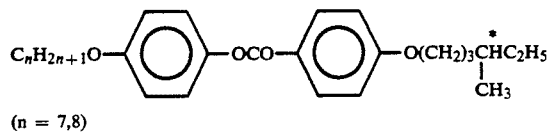

(n = 7,8)

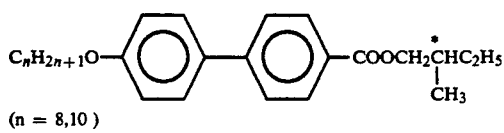
(n = 8,10)

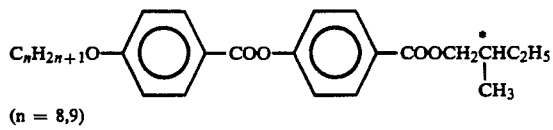
(n = 8,9)

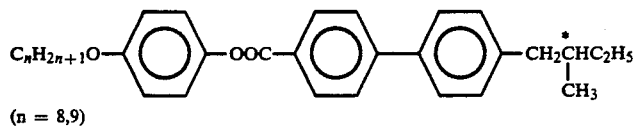
(n = 8,9)

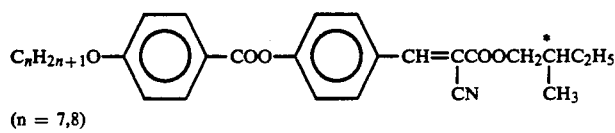
(n = 7,8)

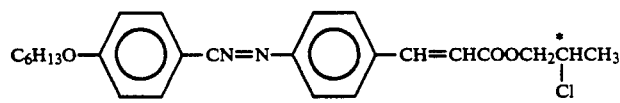

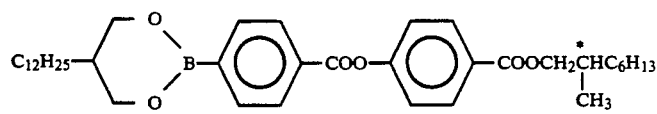

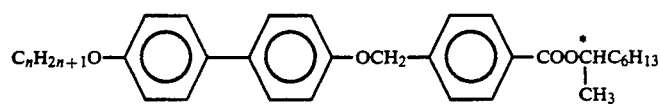

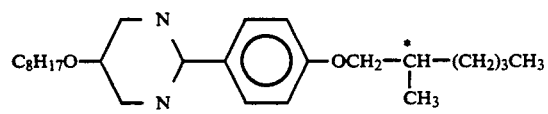

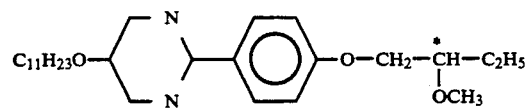

cholesterol derivatives.

As examples of the optically active compound used in the present invention there also may be mentioned optically active high-molecular compounds. Any high polymer may be used if only it contains an optically active group in the molecule, but when the compatibility with the base polymer is taken into account, it is desirable to use a polymer which exhibits liquid crystallinity. Examples are the following liquid crystalline polymers having optical activity: polyacrylates, polymethacrylates, polymalonates, polysiloxanes, polyesters, polyamides, polyester amides, polycarbonates, polypeptides, and cellulose. Above all, from the standpoint of compatibility with the nematic liquid crystalline polymer serving as the base, mainly aromatic, optically active polyesters are most preferred. Examples are the following polymers:

Polymer comprising the following structural units:

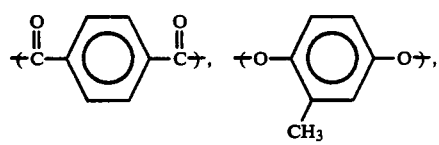

Polymer comprising the following structural units:

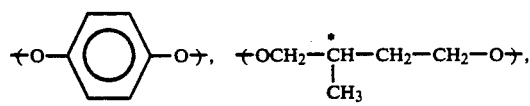

Polymer comprising the following structural units:

$$+C(=O)-C_6H_4-C(=O)+,\quad +O-(CH_2)_2-\overset{*}{C}H(CH_3)-(CH_2)_3-O+$$

Polymer comprising the following structural units:

$$+C(=O)-C_6H_4-C_6H_4-C(=O)+,$$

$$+O-CH_2-\overset{*}{C}H(CH_3)-CH_2CH_2-O+,$$

$$+O+CH_2\xrightarrow{}_n O+\quad (n = 2-12)$$

Polymer comprising the following structural units:

$$+O-C_6H_4-C_6H_4-O+,\quad +O-C_6H_4-O+,$$

$$+C(=O)+CH_2\xrightarrow{}_2 \overset{*}{C}H(CH_3)+CH_2\xrightarrow{}_3 C(=O)+$$

Polymer comprising the following structural units:

$$+C(=O)-C_6H_4-O+,\quad +O-C_6H_3(Cl)-O+,$$

$$+OCH_2-\overset{*}{C}HCH_2-CH_2-O+$$
$$\quad\quad\quad\; |$$
$$\quad\quad\quad\; Cl$$

Polymer comprising the following structural units:

$$+C(=O)-C_6H_4-C(=O)+,\quad +C(=O)-C_6H_4-O+,$$

$$+OCH_2-CH_2-O+,\quad +O\overset{*}{C}HCH_2-O+$$
$$\quad\quad\quad\quad\quad\quad\quad\quad\quad |$$
$$\quad\quad\quad\quad\quad\quad\quad\quad\quad CH_3$$

Polymer comprising the following structural units:

$$+O-C_6H_4-C_6H_4-O+,\quad +C(=O)-C_6H_4-C(=O)+,$$

$$+C(=O)-C_6H_4-O+,\quad +O-CH_2-\overset{*}{C}H(CF_3)-CH_2-CH_2-O+$$

Polymer comprising the following structural units:

$$+O-C_{10}H_6-C(=O)+,\quad +C(=O)-C_6H_4-C(=O)+,$$

$$+C(=O)-C_6H_4-O+,\quad +O+CH_2\xrightarrow{}_2 \overset{*}{C}H(CH_3)+CH_2\xrightarrow{}_3 O+$$

Polymer comprising the following structural units:

$$+C(=O)-C_6H_4-C(=O)+,\quad +O-C_6H_4-O+,$$

$$+O-C_{10}H_6-C(=O)+,$$

$$+O-C_6H_4-O+,\quad CH_2-\overset{*}{C}H(CH_3)-C_2H_5$$

Polymer comprising the following structural units:

$$+C(=O)-C_6H_4-O+CH_2\xrightarrow{}_n O-C_6H_4-C(=O)+,$$

$$+O-C_6H_4-O+,\quad +C(=O)-C_6H_4-O+,$$

$$+O-\overset{*}{C}H(CH_3)CH_2-O+$$

Polymer comprising the following structural units:

$$+C(=O)-C_6H_4-CH=CH-C_6H_4-C(=O)+,$$

$$+O-CH_2-\overset{*}{C}H(CH_3)CH_2-CH_2-O+,$$

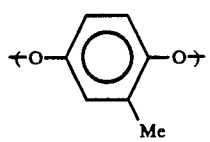

In each of these polymers, the proportion of the unit having an optically active group is usually in the range of 0.5 to 80 mole%, preferably 5 to 60 mole%.

These polymers preferably range in molecular weight from 0.05 to 5.0 in terms of inherent viscosity as determined at 30° C. in phenol/tetrachloroethane for example. An inherent viscosity larger than 5.0 is not desirable because of too high viscosity which eventually causes deterioration of orientatability. An inherent viscosity smaller than 0.05 is not desirable, either, because it becomes difficult to control the composition.

In the present invention, the liquid crystalline polymer which exhibits a twisted nematic orientation in the state of liquid crystal and assumes a glassy state at a temperature below the liquid crystal transition point of the polymer, can be prepared by mixing a nematic liquid crystalline polymer and an optically active compound at a predetermined ratio by a solid mixing, solution mixing or melt-mixing method. The proportion of the optically active component in the composition is in the range of preferably 0.1 to 30 wt%, more preferably 0.3 to 20 wt%, although it differs depending on the proportion of optically active groups contained in the optically active compound or the twisting force of the optically active compound for imparting twist to the nematic liquid crystal. If the proportion of the optically active compound is less than 0.1 wt%, it will be impossible to impart a sufficient twist to the nematic liquid crystal, and a proportion thereof greater than 30 wt% will exert a bad influence on the orientation.

The compensator rotator of the present invention can also be prepared by using a high molecular liquid crystal which provides a uniform, twisted nematic orientation of monodomain for itself without using any other optically active compound and which permits the state of such orientation to be immobilized easily. It is essential that the polymer in question have an optically active group in the molecule and be optically active. Examples are main chain type liquid crystalline polymers such as polyesters, polyamides, polycarbonates and polyester imides, as well as side chain type liquid crystalline polymers such as polyacrylates, polymethacrylates and polysiloxanes. Polyesters are particularly preferred in point of easiness of preparation, superior orientatability and high glass transition point. Most preferred polyesters are those which contain ortho-substituted aromatic units as constituents. But also employable are polymers which, in place of such ortho-substituted aromatic units, contain as constituents bulky substituent-containing aromatic units or aromatic units having fluorine or fluorine-containing substituent groups. These optically active polyesters can be obtained by introducing in the nematic liquid crystalline polyesters so far explained such optically active groups as shown below using diols, dicarboxylic acids and hydroxycarboxylic acids (the * mark in the following formulae represents an optically active carbon):

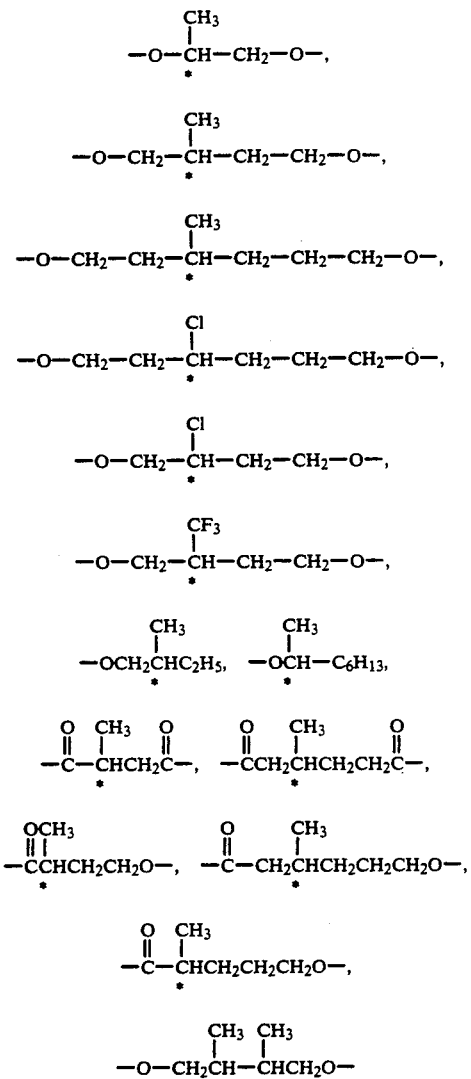

The proportion of these optically active groups in the polymers is in the range of preferably 0.1 to 20 mole%, more preferably 0.5 to 10 mole%. If the said proportion is less than 0.1 mole%, there will not be obtained a twisted structure required for the compensator, and a proportion thereof large than 20 mole% is not desirable because a too strong twisting power will cause the deterioration of the compensating effect. The molecular weights of these polymers are in the range of preferably 0.05 to 3.0, more preferably 0.07 to 2.0, in terms of intrinsic viscosity as determined at 30° C. in, for example, a mixed phenol/tetrachloroethane (60/40) solvent. A smaller intrinsic viscosity than 0.05 is not desirable because the strength of the resulting high molecular liquid crystal will be low, while if the intrinsic viscosity is larger than 3.0, there will arise problems such as the deterioration of orientatability and an increase of the time required for orientation because of too high viscosity during the formation of liquid crystal. Also important are the glass transition points of these polyesters, which exert influence on the stability of orientation after the immobilization of orientation. The glass transition temperature is usually not lower than 0° C., preferably not lower than 10° C. Assuming that the working temperature is room temperature or thereabouts, it is desirable that the glass transition point be not lower than 30° C., more preferably not lower than 50° C., though this differs depending on the use. If the glass transition point is lower than 0° C., the use of the compensator at room temperature or thereabouts may cause a change of the liquid crystal structure which has once been immobilized, thus resulting in the deterioration of a function based on the liquid crystal structure.

These polymers can be prepared by the foregoing melt polycondensation process or acid chloride process.

The following are typical examples of the liquid crystalline polymer used in the present invention described above.

Polymers represented by:

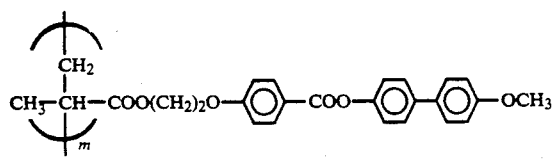

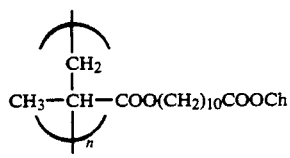

Ch: cholesteryl
m/n = usually 99.9/0.1 to 80/20, preferably 99.5/0.5 to 90/10, more preferably 99/1 to 95/5

Polymers represented by:

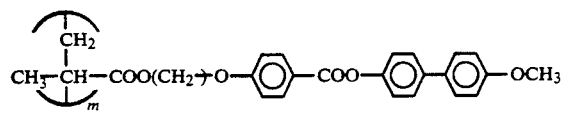

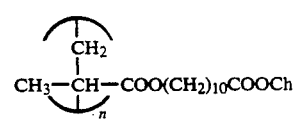

Ch: cholesteryl
m/n = usually 99.9/0.1 to 80/20, preferably 99.5/0.5 to 90/10, more preferably 99/1 to 95/5

Polymers represented by:

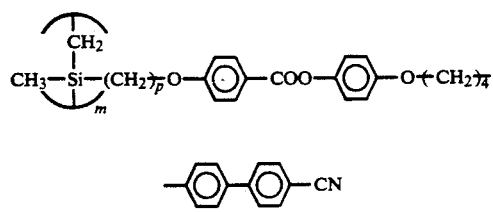

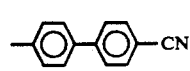

Polymers represented by:

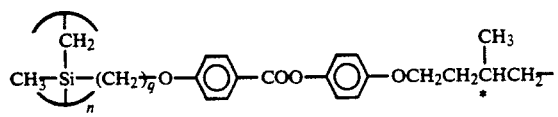

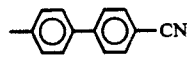

m/n = usually 99.9/0.1 to 70/30, preferably 99.5/0.5 to 90/10, more preferably 99/1 to 95/5
p, q: integer of 2 to 20

Polymers represented by:

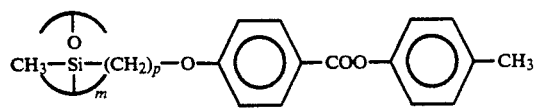

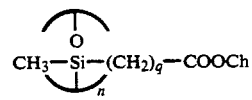

m/n = usually 99.9/0.1 to 70/30, preferably 99.5/0.5 to 90/10, more preferably 99/1 to 95/5
p, q: integer of 2 to 20

Polymers represented by:

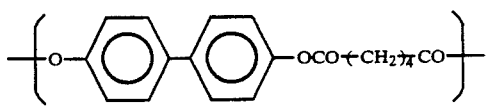

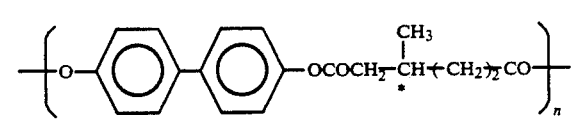

m/n = usually 99.9/0.1 to 80/20, preferably 99.5/0.5 to 90/10, more preferably 99/1 to 95/5

Polymers represented by:

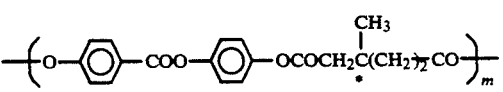

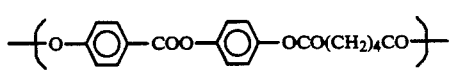

m/n = 0.5/99.5 to 10/90, preferably 1/99 to 5/95

Polymers represented by:

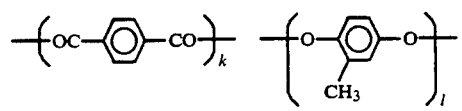 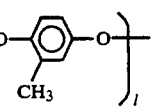

-continued

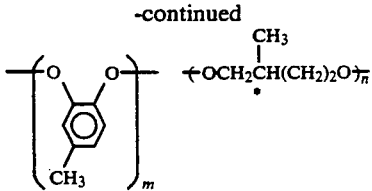

k = 1 + m + n
k/n = 99.5/0.5 to 90/10, preferably 99/1 to 95/5
l/m = 5/95 to 95/5

Polymers represented by:

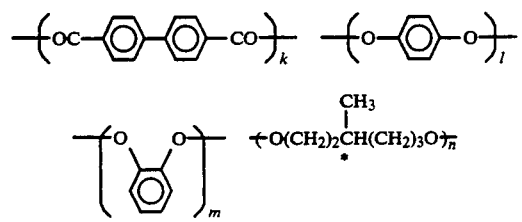

k = 1 + m + n
k/n = 99.5/0.5 to 90/10, preferably 99/1 to 95/5
l/m = 5/95 to 95/5

Polymer mixtures represented by:

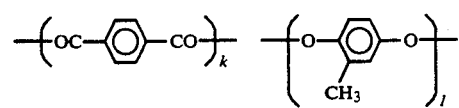 (A)

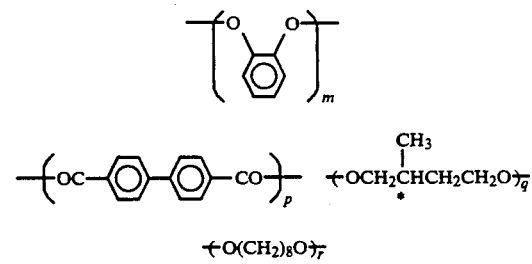 (B)

(A)/(B) = usually 99.9/0.1 to 80/20 (weight ratio),
preferably 99.5/0.5 to 85/5, more preferably
99/1 to 95/5
k = 1 + m
l/m = 75/25 to 25/75
p = q + r
p/q = 80/20 to 20/80

Polymer mixtures represented by:

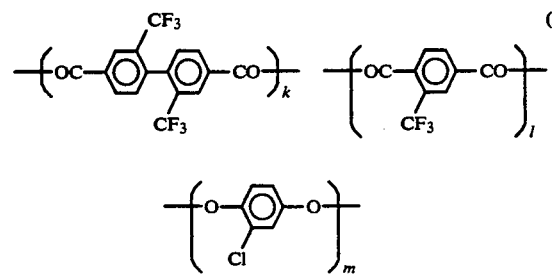

cholesteryl benzoate (B)

-continued
(A)/(B) = usually 99.9/0.1 to 70/30 (weight ratio),
preferably 99.5/0.5 to 80/20, more preferably
99/1 to 90/10
m = k + l
k/l = 80/20 to 20/80

Polymer mixtures represented by:

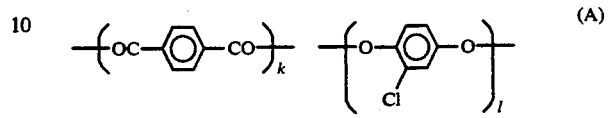 (A)

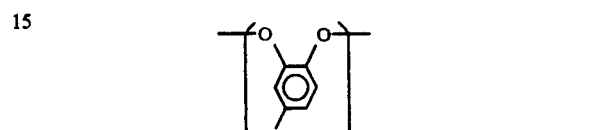

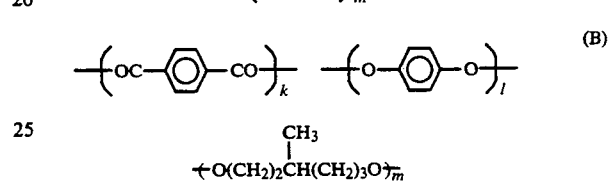 (B)

(A)/(B) = usually 99.5/0.1 to 70/30 (weight ratio),
preferably 99.5/0.5 to 80/20, more preferably
99/1 to 90/10
k = 1 + m
l/m = 25/75 to 75/25
p = q + r
p/r = 20/80 to 80/20

The mark * represents an optically active carbon.

These polymers range in molecular weight preferably from 0.05 to 3.0, more preferably 0.07 to 2.0, in terms of inherent viscosity as determined at 30° C. in a solvent, e.q. tetrahydrofuran, acetone, cyclohexanone, or mixed phenol/tetrachloroethane (60/40) solvent. If the inherent viscosity is smaller than 0.05, the strength of the resulting liquid crystalline polymer will be low, and a larger value than 3.0 will result in too high viscosity during the formation of liquid crystal, thus causing deteriorated orientatability and increase in the time required for orientation.

How to form the compensating layer on the orientating base will now be described in more detail. First, it is important to select an orientating base according to the kind of the liquid crystalline polymer used. More particularly, it is necessary to select an orientating base which is not affected by the solvent used for the preparation of a liquid crystalline polymer solution and which can withstand a heat treatment temperature, as noted previously. Further, it is desirable for the orientating base to have a moderate releasability for separation of the compensating layer therefrom in the subsequent transfer step.

For example, in the case of using a polyester-based liquid crystalline polymer, as already mentioned, preferred example of such orientating base are directly rubbing-treated films or sheets of polyimides, polyether ether ketones, polyphenylene sulfides, and polyethylene terephthalates, because these films and sheets satisfy the above-mentioned properties.

When a composition comprising a nematic liquid crystalline polymer and an optically active compound is used as the liquid crystalline polymer, for example in the case of a solution mixing, first both components are dissolved in a solvent at predetermined proportions to prepare a solution of a predetermined concentration. In the case where an optically active polymer which per se exhibits a twisted nematic orientation is used in place of such liquid crystalline polymer composition, the optically active polymer alone is dissolved in a predetermined solvent at a predetermined concentration to prepare a solution. In this case, the solvent to be used differs depending on the kind of the polymer used, but usually there may be used, for example, any of ketones such as acetone, methyl ethyl ketone and cyclohexanone, ethers such as tetrahydrofuran and dioxane, halogenated hydrocarbons such as chloroform, dichloroethane, tetrachloroethane, trichloroethylene, tetrachloroethylene and o-dichlorobenzene, mixed solvents thereof with phenol, as well as dimethylformamide, dimethylacetamide, and dimethyl sulfoxide. The concentration of the solution differs greatly depending on the viscosity of the polymer used, but usually it is in the range of 5 to 50 wt%, preferably 10 to 30 wt%. The solution is then applied onto the orientating base, for example by spin coating method, roll coating method, printing method, curtain coating method, or dipping/pulling-up method. After the application of the solution, the solvent is removed by drying, followed by heat treatment at a predetermined temperature for a predetermined time to complete a twisted nematic orientation of monodomain. For assisting the orientation based on the interfacial effect, the lower the polymer viscosity, the better, and hence the higher the temperature, the more preferable, provided a too high temperature is not desirable because it will cause an increase of cost and deterioration of the working efficiency. A certain polymer has an isotropic phase in a higher temperature region than nematic phase, so even if heat treatment is made in this temperature region, there will not be obtained orientation. Thus, it is desirable that in accordance with the characteristics of the polymer there be performed heat treatment at a temperature not lower than the glass transition point thereof and below the transition point to an isotropic phase. Usually, the range of 50° to 300° C. is preferable and the range of 100° to 250° C. is more preferable. The time required for obtaining a satisfactory orientation in the state of liquid crystal on the alignment film differs depending on the composition and molecular weight of the polymer used, but preferably it is in the range of 10 seconds to 100 minutes, more preferably 30 seconds to 60 minutes. If the said time is shorter than 10 seconds, the orientation obtained will be unsatisfactory, and if it is longer than 100 minutes, the transparency of the resulting compensator may be deteriorated. The same state of orientation can also be obtained by applying the polymer in a melted state onto the base which has been subjected to the orientation treatment, followed by heat treatment. By performing these treatments using the liquid crystalline polymer in the present invention there can be obtained a uniform, twisted nematic orientation throughout the whole upper surface of the alignment film in the state of liquid crystal. In this case, the twist angle or twist direction can be adjusted by adjusting the kind and proportion of the optically active unit in the polymer or the kind or amount of the optically active compound to be incorporated therein.

By subsequent cooling to a temperature below the glass transition point of the liquid crystalline polymer the orientated state thus obtained can be solidified without impairing the orientation. Generally, in the case of using a polymer having crystal phase in a lower temperature region than the liquid crystal phase, the orientation in the state of liquid crystal will be destroyed by cooling. In the method of the present invention, such phenomenon does not occur because there is used a polymer having glass phase under the liquid crystal phase, and it is possible to solidify the twisted nematic orientation completely.

The cooling rate is not specially limited. Such orientation is solidified by mere transfer from within the heating atmosphere into an atmosphere held at a temperature below the glass transition point of the liquid crystalline polymer. For enhancing the production efficiency there may be performed a forced cooling such as air cooling or water cooling. The film thickness of the compensating layer after the solidification is preferably in the range of 0.1 to 100 $\mu$m, more preferably 0.5 to 50 $\mu$m. If the film thickness is smaller than 0.1 $\mu$m, there will not be obtained necessary twist angle and $\Delta n \cdot d$, and if the film thickness exceeds 100 $\mu$m, the alignment film will become less effective, thus making it difficult to obtain a uniform orientation.

In order for the compensator of the present invention to exhibit a satisfactory compensating effect and obtain a black and-white display of high quality, it is important to strictly control optical parameters of the compensating layer, and it is necessary that the constituent molecules of the compensating layer have a helical structure with a helical axis in a direction perpendicular to the base, with the twist angle thereof being in the range of 70 to 300 degrees, and that the product $\Delta n \cdot d$ of birefringence $\Delta n$ of the liquid crystalline polymer film and the film thickness d be in the range of 0.1 to 3.0 $\mu$m. Particularly, for TFT, the twist angle is usually in the range of 70° to 150°, preferably 80° to 120°, and $\Delta n \cdot d$ is usually in the range of 0.2 to 3.0 $\mu$m, preferably 0.3 to 2.8 $\mu$m. For STN, the twist angle usually in the range of 150° to 300°, preferably 170° to 280°, and $\Delta n \cdot d$ is usually in the range of 0.1 to 1.5 $\mu$m, preferably 0.3 to 1.2 $\mu$m. If the values of the twist angle and $\mu n \cdot d$ are not in the above ranges, the desired color compensating effect will not be obtained to a satisfactory extent and there will not be obtained a satisfactory black-and-white display. In order for the constituent molecules of the compensating layer to have a helical structure with a helical axis in a direction perpendicular to the base and also have required twist angle and $\Delta n \cdot d$, it is necessary that composition comprising the liquid crystalline polymer and the foregoing amount of an optically active compound, or a liquid crystalline polymer having the foregoing proportion of optically active groups in the molecule thereof, are orientated on the orientating base and solidified to a predetermined film thickness in the manner described above.

The transfer step will now be described. First, the compensating layer on the orientating base thus obtained and another light transmitting base are stuck together using an adhesive. Then, the compensating layer and the light transmitting base are peeled off at the base-compensating layer interface to transfer the compensating layer to the light transmitting base side, whereby the compensator for liquid crystal display of the present invention is produced.

As such light transmitting base there may be used a plastic film having transparency and optical isotropy. Examples are films of polymethyl methacrylates, polystyrenes, polycarbonates, polyether sulfones, polyphenylene sulfides, polyarylates, amorphous polyolefins, triacetyl cellulose, and epoxy resins. Particularly, polymethacrylates, polycarbonates, polyester sulfones, polyarylates and amorphous polyolefins are preferred. As another example of the light transmitting base, mention may be made of a polarizing film. The polarizing film is an optical element essential to liquid crystal display and the use of the polarizing film is very convenient because the compensating layer and the polarizing film can be integrated together into an optical element. A further example of the light transmitting base is a liquid crystal cell itself. The liquid crystal cell uses two, upper and lower glass bases with electrode, and if the compensating layer is transferred to the upper or lower or both glass plates, the glass plates of the cell per se constitute a compensator.

The adhesive for sticking the light transmitting base and the compensating layer together is not specially limited if only it is of an optical grade. Examples are acryl-, epoxy-, ethylene/vinyl acetate copolymer- and rubber-based adhesives.

The transfer of the compensating layer onto the light transmitting base can be done by peeling off the orientating base at the base-compensating layer interface after bonding. This separation may be done by any of a mechanical method using rolls or the like, a method involving immersion in a poor solvent for all of the constituent materials and subsequent mechanical separation, a method involving the application of ultrasonic wave in a poor solvent, a method involving the application of a temperature change by utilizing the difference in thermal expansion coefficient between the orientating base and the compensating layer, and a method of dissolving off the orientating base itself or the alignment film on the base. Since the releasability differs depending on the adhesion between the liquid crystalline polymer and the orientating base, there should be adopted a method most suitable for the system used.

In this way there is produced the compensator for liquid crystal display of the present invention which is of a three-layer structure comprising the compensating layer, adhesive layer and the light transmitting base. The compensator may be used as it is, or a protective layer formed of a transparent plastic material may be provided for surface protection. Or the compensator may be used in a combined form with another optical element such as a polarizing film.

Thus, the compensator for liquid crystal display produced by the method of the present invention not only permits a perfect black-and-white display but also is of low cost and thin and light. Further, since the light transmitting base can be selected over an extremely wide range of selection, there can be obtained compensators of various performances and forms. These compensators can be applied to STN and TFT liquid crystal displays and are of extremely great industrial value.

EXAMPLES

Working examples of the present invention will be described below, but the invention is not limited thereto. In the working examples there were used the following analyzing methods.

(1) Determination of Polymer Composition

Polymer was dissolved in deuterated chloroform or deuterated trifluoroacetic acid and the polymer composition was determined using $^1$H-NMR (JNM-GX400, a product of Japan Electron Optics Laboratory Co., Ltd.) of 400 MHz.

(2) Inherent Viscosity

Determined at 30° C. in a mixed phenol/tetrachloroethane (60/40 weight ratio) solvent using an Ubbelohde's viscometer.

(3) Determination of Liquid Crystal Phase Series

Determined by measurement using DSC (Du Pont 990 Thermal Analyzer) and observation using an optical microscope (a polarizing microscope BH2, a product of Olympus Optical Co., Ltd.).

(4) Twist Angle and $\Delta n \cdot d$

Twist angle was determined by a polarizing analysis method, while $\Delta n \cdot d$ was determined by analyzing data obtained using an ellipsometer.

EXAMPLE 1

There was prepared a 15 wt% solution of a mixed polymer (inherent viscosity of a base polymer: 0.18, Tg =95°C., inherent viscosity of an optically active polymer: 0.13) represented by the following formula (1) in phenol/tetrachloroethane (60/40 weight ratio):

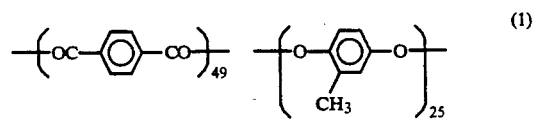

 97.2 wt %

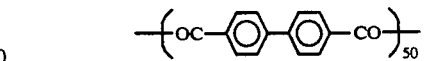

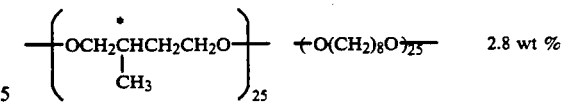 2.8 wt %

The mark * represents an optically active carbon.

This solution was cast over a 125 μm thick, rubbing-treated polyimide film of 15 cm×23 cm, using a screen printer, then dried, heat-treated at 200° C. for 40 minutes and thereafter cooled to solidify. The compensating layer thus formed was found to have a twist angle of −231° and $\Delta n \cdot d$ of 0.84 μm. A 100 μm thick polyether sulfone film of 15 cm×23 cm was stuck onto the compensating layer, using an acrylic adhesive. Then, the polyimide film and the compensating layer were separate from each other slowly at the interface thereof using rolls.

Figure 2:
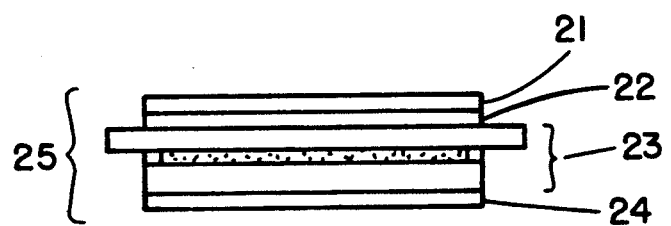
FIG. 2 is a sectional view of the liquid crystal cell used in the working examples of the present invention.
Figure 3:
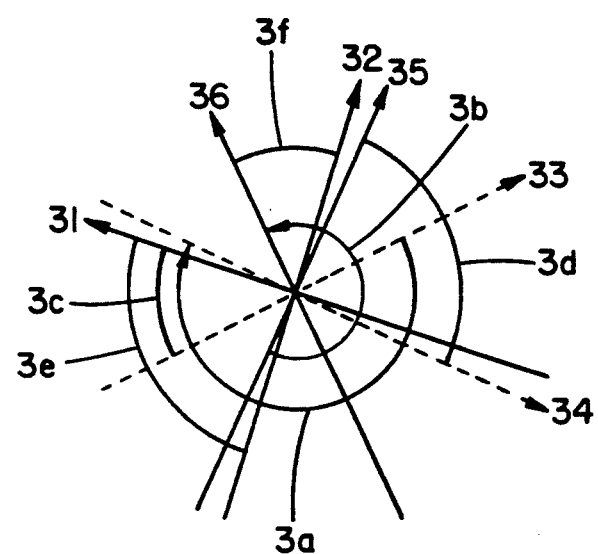
FIG. 3 illustrates a correlation of optical axes of the constituent materials of the liquid crystal cell used in the working examples of the present invention.

As shown in FIG. 2, the compensator thus produced was placed on the upper surface of an STN liquid crystal cell of 1/200 duty drive having a twist angle of 230° and $\Delta n \cdot d$ of 0.87 μm, and further a polarizing plate was stuck thereon to form a liquid crystal cell. In this case, the directions of the upper and lower polarizing plates, the rubbing directions of the upper and lower electrode plates and the molecular orientation direction of the compensating layer are as illustrated in FIG. 3. The angle between the polarization axes of the upper and lower polarizing plates is 90°, the angle between the lower polarizing plate and the rubbing direction of the lower electrode plate is 45°, the angle between the rubbing direction of the upper electrode plate and the molecular orientation direction of the surface of the compensating layer in contact with the upper electrode base is 90°, and the angle between the molecular orientation direction of the surface of the compensator in contact with the upper polarizing plate and the transmission axis of the upper plarizing plate is 45°.

The display color of this liquid crystal cell was a complete black-and-white display color. Contrast ratio was 60 and luminance 100 cd/m² and there was obtained a high grade display.

EXAMPLE 2

There was prepared a 16 wt% solution of the mixed polymer (inherent viscosity of a base polymer: 0.18, Tg =95° C., inherent viscosity of an optically active polymer: 0.13) of formula (1) in phenol/tetrachloroethane (60/40 weight ratio). This solution was cast over a 50 μm thick, rubbing-treated polyether ether ketone film of 15 cm×23 cm, using a screen printer, then dried, beat-treated at 200° C. for 45 minutes and thereafter cooled to solidify. This compensating layer was found to have a twist angle of 230° and Δn·d of 0.84 μm. A 120 μm thick polarizing film with tackifier of 15 cm×23 cm was stuck onto the compensating layer in such a manner that the angle between the transmission axis of the polarizing film and the rubbing direction of the orientating base was 5°. Then, the laminate was dipped in hexane and subjected to the radiation of ultrasonic wave for 5 minutes, then pulled up. Thereafter, the orientating base and the compensating layer were separated from each other slowly at the interface thereof. A test cell was assembled as in FIG. 2 so that the compensating layer in the compensator with the polarizing film was located on the liquid crystal cell side (in this embodiment the compensator indicated at 22 in FIG. 2 is the very compensating layer) and so that optical axes were arranged as in FIG. 3. Then, a compensating effect was checked in the same manner as in Example 1. The display color of this liquid crystal cell was a complete black-and-white display color. Contrast ratio was 65 and luminance 105 cd/m² and there was obtained a high grade display.

EXAMPLE 3

There was prepared a 20 wt% solution of an optically active polymer (inherent viscosity: 0.15, Tg=81° C.) represented by the following formula (2) in tetrachloroethane:

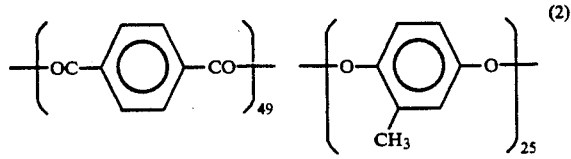

(2)

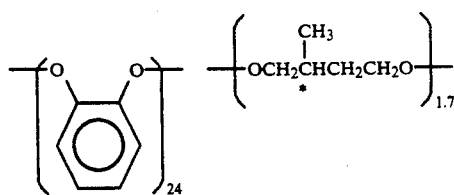

Separately, an aqueous polyvinyl alcohol solution was applied onto a surface-ground, 2 mm thick stainless steel plate of 15 cm×23 cm, then dried and thereafter subjected to a rubbing treatment to obtain an orientating base. Onto this base was applied the polymer solution prepared above, by a spin coating method, then dried, thereafter heat-treated at 180° C. for 40 minutes and subsequently cooled for solidification to form a compensating layer. The compensating layer was found to have a twist angle of −228° and Δn·d of 0.835 μm.

A 120 μm thick polycarbonate film with pressure sensitive adhesive of 15 cm×23 cm was stuck onto the compensating layer. The laminate thus obtained was immersed in water for 1 hour, thereafter the orientating base and the compensating layer were separated from each other slowly at the interface thereof, followed by drying. A test cell was assembled as in FIG. 2 so that the compensating layer of the compensator was located on the liquid crystal cell side and so that optical axes were arranged as in FIG. 3. Then, a compensating effect was checked in the same manner as in Example 1.

The display color of this liquid crystal cell was a complete black-and-white display color. Contrast ratio was 59 and luminance 100 cd/m² and there was obtained a high grade display.

EXAMPLE 4

There was prepared a 20 wt% solution of a mixed polymer (inherent viscosity of a base polymer: 0.21, Tg=60° C., inherent viscosity of an optically active polymer: 0.18) represented by the following formula (3) in dimethylformamide:

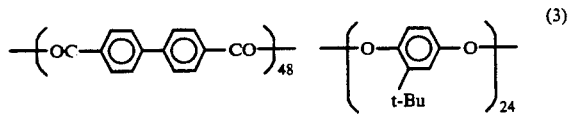

(3)

94.0 wt %

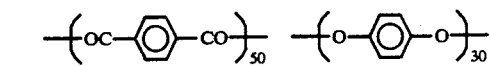

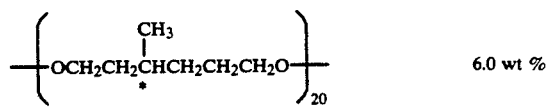

6.0 wt %

The mark * represents an optically active carbon.

Separately, a surface-ground, 5 mm thick polyether ether ketone sheet of 15 cm×23 cm was subjected directly to a rubbing treatment to form an orientating base. Then, the polymer solution prepared above was applied onto the orientating base by a spin coating method, then dried, thereafter heat-treated at 150° C. for 20 minutes and subsequently cooled for solidification to form a compensating layer. The compensating layer was found to have a twist angle of −229° and Δn·d of 0.843 μm.

A 120 μm thick triacetyl cellulose film with pressure sensitive adhesive of 15 cm×23 cm was stuck onto the compensating layer. After standing 1 hour, the orientating base and the compensating layer were separated from each other slowly at the interface there of using rolls.

A test cell was assembled as in FIG. 2 so that the compensating layer of the compensator was located on the liquid crystal cell side, in such an arranged state of optical axes as in FIG. 3. Then, a compensating effect was checked in the same manner as in Example 1.

The display color of this liquid crystal cell was a complete black-and-white display color. Contrast was 61 and luminance 105 cd/m² and there was obtained a high grade display.

EXAMPLE 5

There was prepared an 18 wt% solution of an optically active polymer (inherent viscosity) of the following formula (4) in trichloroethane:

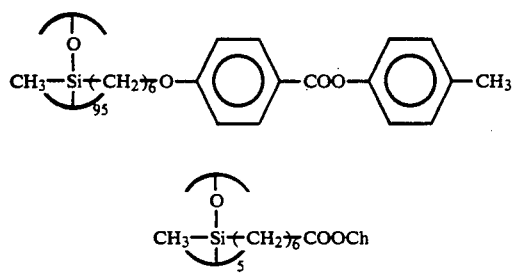

Ch: cholesteryl

Separately, an 80 μm thick polyethylene terephthalate film of 15 cm×23 cm was subjected directly to a rubbing treatment to obtain an orientating base. Then, the polymer solution prepared above was applied onto the orientating base, then dried, thereafter heat-treated at 100° C. for 20 minutes and thereafter cooled for solidification to form a compensating layer. The compensating layer was found to have a twist angle of −227° and Δn·d of 0.83 μm.

A 120 μm thick polyether sulfone film with pressure sensitive adhesive of 15 cm×23 cm was stuck onto the compensating layer. The laminate thus obtained was allowed to stand 1 hour at −15° C. and then immediately the orientating base and the compensating layer were separated from each other slowly at the interface thereof.

A test cell was assembled as in FIG. 2 so that the compensating layer of the compensator was located on the liquid crystal cell side, in such an arranged state of optical axes as in FIG. 3. Then, a compensating effect was checked in the same manner as in Example 1. The display color of this liquid crystal cell as a complete black-and-white display color. Contrast ratio was 58 and luminance 100 cd/m² and there was obtained a high grade display.

EXAMPLE 6

There was prepared a 15 wt% solution of the mixed polymer (inherent viscosity of a base polymer: 0.18, inherent viscosity of an optically active polymer: 0.13) of the formula (1) in phenol/tetrachloroethane (60/40 weight ratio). This solution was cast over a rubbing-treated, 50 μm thick polyether ether ketone film of 15 cm×23 cm, using a screen printer, then dried, thereafter heat-treated at 200° C. for 40 minutes and subsequently cooled for solidification to form a compensating layer. The compensating layer was found to have a twist angle of −230° and Δn·d of 0.84 μm.

Next, an adhesive was applied uniformly onto the upper glass surface of the STN liquid crystal cell used in Example 1, and then the polyther ether ketone film with the compensating layer prepared above was stuck onto the said tackifier layer in such a manner that the surface of the compensating layer was in contact with the adhesive layer. After standing 1 hour, only the polyether ether ketone film was peeled off slowly, allowing the compensating layer to be transferred onto the upper glass surface of the liquid crystal cell. Further, a polarizing film was stuck thereon. In this case, optical axes were set as in FIG. 3. The display of the test cell thus prepared was completely colorless and there was obtained a beautiful black-and-white display.

EXAMPLE 7

There was prepared a 15 wt% solution of a mixed polymer (inherent viscosity of a base polymer: 0.18, Tg=72° C.) represented by the following formula (5) in phenol/tetrachloroethane:

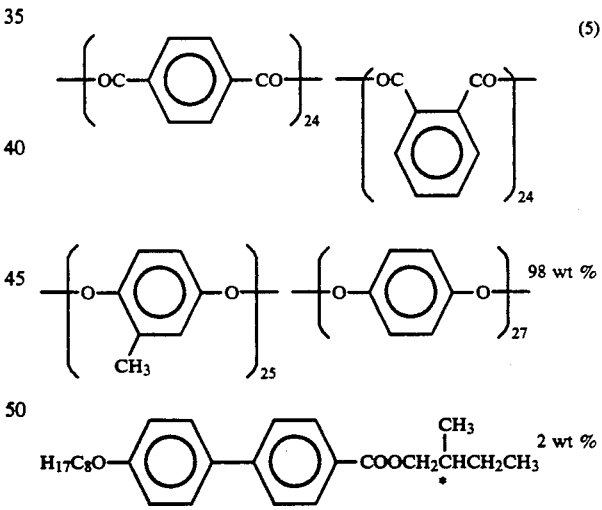

The mark * represents an opticaly active carbon.

As an orientating base there was used a polyimide sheet of 10 cm×10 cm which had been subjected to a rubbing treatment directly, and the solution prepared above was applied onto the polyimide sheet by a spin coating method, then dried, thereafter heat-treated at 150° C. for 30 minutes and subsequently cooled for solidification to form a compensating layer. The compensating layer was found to have a twist angle of −90° and Δn·d of 0.52 μm.

A polarizing film with tackifier was stuck onto the compensating layer and thereafter the polyimide film and the compensating layer were separated from each other slowly at the interface thereof, allowing the compensating layer to be transferred to the film side.

Next, this compensator was placed onto a twisted nematic (TN) liquid crystal cell having a twist angle of 90° and Δn·d of 0.52 μm in such compensating layer was located on the cell side. At this time, optical axes were set so that the angle between the rubbing direction of an upper electrode base of the liquid crystal cell and the molecular orientation direction of the compensating layer surface in contact with the upper electrode base was 90° and the angle between two, upper and lower polarizing films was 0°.

A compensating effect of this test cell was checked; as a result, there was obtained a far more complete black color than in the omission of the compensator.

According to the liquid crystal display compensator producing method of the present invention, since roles are separated between the orientating base and the light transmitting base, the freedom of base selection becomes wider to a great extent, thus permitting the fabrication of compensators of various performances and forms. Thus, the method of the present invention is extremely useful in upgrading performance and reducing weight, thickness and cost of various liquid crystal displays.

We claim:

1. A method for producing a compensator for liquid crystal display comprising forming a liquid crystalline polymer layer on an orienting base; and transferring said liquid crystalline polymer layer onto a light transmitting base wherein a compensator is formed.

2. A method as set forth in claim 1, wherein said light transmitting base is a plastic film.

3. A method as set forth in claim 1, wherein said light transmitting base is a polarizing film.

4. A method as set forth in claim 1, wherein said light transmitting base corresponds to at least one of upper and lower glass bases of a liquid crystal display cell.

5. A method for producing a compensator for a liquid crystal display comprising forming a liquid crystal polymer layer, said polymer layer exhibiting twisted nematic orientation in the state of liquid crystallinity and a glassy state at temperatures below the liquid crystal transition point thereof, on an orienting base; and transferring said liquid crystalline polymer layer onto a light transmitting base.

* * * * *